United States Patent Office 3,320,335
Patented May 16, 1967

3,320,335
PROCESS FOR POLYMERIZING HIGHER LACTAMS IN THE PRESENCE OF URETHANE POLYMER PROMOTERS
Ross M. Hedrick, St. Louis, and Edward H. Mottus, Ballwin, Mo., assignors to Monsanto Company, a corporation of Delaware
No Drawing. Filed Apr. 22, 1963, Ser. No. 274,784
9 Claims. (Cl. 260—858)

This invention relates to a novel process for the polymerization of higher lactams containing at least six carbon atoms in the lactam ring to produce useful polyamide compositions suitable for the production of fibers, films, coatings, cast and molded objects, and the like. More particularly this invention relates to the novel process for effecting the rapid low-temperature polymerization of such higher lactams in the presence of an anionic polymerization catalyst and an N-substituted urethane promoter compound.

The production capacity of caprolactam in the United States was of the order of about 170 million pounds in 1962. Additionally caprolactam is the principal monomeric raw material for the production of polyamide compositions in the European chemical industry and there is continuing expansion both domestic and foreign for the production of caprolactam. Accordingly, ε-caprolactam is the most readily commercially available higher lactam, whereby caprolactam will be employed as representative of the higher lactams to illustrate the instant invention.

Numerous polymerization processes have been suggested for the polymerization of higher lactams in general and caprolactam in particular. One method has been the hydrolytic process wherein the caprolactam is heated at an elevated temperature of from about 200° to about 300° C. under superatmospheric pressure in the presence of not less than 0.1 mole and preferably from 1 to 4 moles, but less than 10 moles of water in an initial reaction and the polymerization is subsequently continued at atmospheric pressure, or under a reduced pressure, to remove the water and unreacted monomer (U.S. Patent No. 2,241,322). The hydrolytic process requires a relatively long period of time to effect a satisfactory degree of polymerization and thus is an expensive process for the commercial production of useful polymers. Another process for the catalytic conversion of caprolactam to polycaprolactam is by the two-stage reaction of the caprolactam in the presence of metallic sodium or any of the alkali or alkaline earth metals. The initial reaction is carried out at about 100° to about 150° C., and thereafter the polymerization is effected at a temperature of about 230° to 250° C. for a period of 0.5 to 2 hours (U.S. Patent No. 2,251,519). Still another process for the polymerization of caprolactam employs alkali metal hydrides as catalysts and effects the polymerization at temperatures above the melting point of the polycaprolactam and the preferred temperature is in the range of from about 230° to 260° C. (U.S. Patent No. 2,647,105). Another process for the polymerization of caprolactam employs a mixed catalyst of alkali metal hydroxide and alkali metal, or alkali metal amide, or alkali metal hydride, at polymerization temperatures in the range of about 215° to 265° C. (U.S. Patent No. 2,805,214). The aforesaid prior art processes in general all require relatively high polymerization temperatures of above 200° C. and up to 300° C., and do not provide a high conversion to the desired polymer. Thus, for example, in the polymerization system employing ε-caprolactam the equilibrium conditions are such that the final reaction mixture contains of the order of about 90% polymer and 10% monomer.

More recently, it has been found that the polymerization of the higher lactams can be initiated at temperatures of the order of 80° C. and higher and generally below 200° C. by the anionic polymerization of such higher lactams in the presence of specific promoter compounds such as N-substituted imides, e.g., N-acyl lactams, cyclic imides of dicarboxycyclic acids, etc., N-acyl sulfonamides, disulfonamides, N-nitrosoamides, N-nitrososulfonamides and various thioacyl analogs, isocyanates, and N,N'-disubstituted and trisubstituted ureas and thioureas. (See U.S. Patent Nos. 3,017,391, 3,018,273, 3,028,369, and 3,086,962.)

The principal object of this invention is to provide an improved process for the polymerization of higher lactams and especially of ε-caprolactam. Another object of this invention is to provide a process for the polymerization of caprolactam at temperatures above the melting point of the caprolactam, but below the melting point of the polycaprolactam. A further object of this invention is to provide a process for the polymerization of caprolactam wherein said polymerization is initiated at temperatures below about 200° C. A still further object of this invention is to provide a process for the polymerization of caprolactam whereby a high conversion to the polycaprolactam is obtained. Yet another object of this invention is to provide a system wherein the various components can be mixed and held together at temperatures up to the order of about 120° C. without substantial polymerization and thereafter effect polymerization by raising the temperature to the order of about 140° C. and higher. Other objects and advantages of this invention will be apparent to those skilled in the art from the following disclosure.

We have now found that the N-substituted urethanes, N-substituted thiourethanes, N-substituted thionourethanes, and N-substituted dithiourethanes are effective promoter compounds for the anionic polymerization of the higher lactams. Said class of N-substituted urethanes can be illustrated by the structural formula

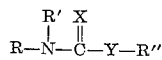

wherein R is selected from the group consisting of hydrocarbyl, i.e., monovalent hydrocarbon radicals free from non-benzenoid unsaturation, such as alkyl, cycloalkyl, aralkyl, aryl, alkaryl, preferably containing from 1 to 20 carbon atoms and more preferably still containing from 1 to 12 carbon atoms, divalent hydrocarbon radicals free from nonbenzenoid unsaturation, and various substituents contained in such radicals as hereinafter more fully pointed out; R' is selected from the group consisting of the hydrogen atom and the hydrocarbyl radicals of R above; R" is a hydrocarbyl radical or divalent hydrocarbon radical as set out in R above; X is selected from the group consisting of oxygen and sulfur; and Y is selected from the group oxygen and sulfur. R and R' together can form a divalent hydrocarbon radical whereby the promoter compound is in the form of a ring compound containing the divalent carbamic radical therein (including also the divalent thiocarbamic radical, the thionocarbamic radical, and the dithiocarbamic radical). Also R and R' can be joined together through a divalent hydrocarbon radical to provide a ring structure in the aforesaid class of compounds.

Preferred promoter compounds can therefore generically be classed as hydrocarbyl N-hydrocarbylcarbamates, hydrocarbyl N,N-dihydrocarbylcarbamates, hydrocarbyl N-hydrocarbylthiocarbamates, hydrocarbyl N,N-dihydrocarbylthiocarbamates, hydrocarbyl N-hydrocarbylthionocarbamates, hydrocarbyl N,N-dihydrocarbylthionocarbamates, hydrocarbyl N-hydrocarbyldithiocarbamates, and hydrocarbyl N,N-dihydrocarbyldithiocarbamates. As indicated hereinabove the various hydrocarbyl radicals can in turn contain various substituents therein, which are inert in the instant reaction, for example halogen atoms such as chlorine, bromine, iodine and fluorine-substituted hydrocarbyl radicals, such as chlorophenyl, bromotolyl, iodophenyl, etc.; alkoxy and related radicals such as methoxy, ethoxy, propoxy, 2-ethylhexoxy, phenoxy, toloxy, and other modified hydrocarbon radicals containing the oxa or thia structure substituted for a carbon atom such as the ethers and thioethers. Illustrative examples of suitable R, R', and R'' radicals are for example methyl, ethyl, propyl, isopropyl, n-butyl, sec.-butyl, tert.-butyl, isobutyl, amyl, isoamyl, hexyl, isohexyl, heptyl, octyl, 2-ethylhexyl, nonyl, decyl, undecyl, dodecyl, tridecyl, tetradecyl, hexadecyl, octadecyl, cyclopropyl, cyclobutyl, cyclopentyl, cyclohexyl, bicyclohexylyl, decahydronaphthyl, tetradecahydroanthryl, tetrahydroabietyl, phenyl, biphenylyl, naphthyl, anthryl, benzyl, phenethyl, benzohydryl, α-mesityl, tolyl, xylyl, mesityl, duryl, cumyl, and the like. Where R and R', or R and R'' are linked together through a divalent hydrocarbon radical, e.g., trimethylene, pentamethylene (i.e., hexahydropyridyl), it is preferred that a lower molecular weight polymethylene chain be employed. However, the ring structure can also contain the divalent oxygen and sulfur linkages.

It will further be understood that urethane compounds containing a plurality of N-carbamate and analogous radicals can be employed, for example the reaction product of 1 mole of a dihydric alcohol with 2 moles of an isocyanate to give N,N'-dihydrocarbyl bis-carbamates of the dihydric alcohols, 1 mole of a diisocyanate with 2 moles of a monohydric alcohol, and polyurethanes wherein the molecule is built up from diisocyanates and dihydric alcohols or equivalent reactants.

Specific illustrative urethanes and analogs thereof which are suitable for use as promoters for the polymerization of higher lactams are for example:

N-methyl urethane
N-ethyl urethane
N-cyclohexyl urethane
N-phenyl urethane
N,N-diphenyl urethane
N-naphthyl urethane
N-tert.-butyl urethane
N-stearyl urethane
N-n-propyl urethane
N-isobutyl urethane
Cyclohexyl N-methyl carbamate
Heptyl N-ethyl carbamate
Isobutyl N-ethyl carbamate
Isopropyl N-ethyl carbamate
Methyl N-ethyl carbamate
Phenyl N-ethyl carbamate
Propyl N-ethyl carbamate
Tetrahydrofurfuryl N-ethyl carbamate
Hexyl N-ethyl carbamate
2-ethylhexyl N-ethyl carbamate
Pentyl N-ethyl carbamate
Butyl N-ethyl carbamate
Sec.-butyl N-ethyl carbamate
Stearyl N-ethyl carbamate
Benzyl N-ethyl carbamate
Tolyl N-ethyl carbamate
p-Chlorobenzyl N-ethyl carbamate
Ethyl N-cyclohexyl carbamate
Heptyl N-isobutyl carbamate
Ethyl N-phenyl carbamate
Ethyl N-hexyl carbamate
Ethyl N-2-ethylhexyl carbamate
Ethyl N-p-chlorophenyl carbamate
Methyl N-stearyl carbamate
Phenyl N-phenyl carbamate
Isopropyl N-isopropyl carbamate
Isopropyl N-phenyl carbamate
Ethyl N-ethyl carbamate
2-keto-tetrahydro-1,3-oxazine
Benzyl N,N-diethyl carbamate
Methyl N-benzyl carbamate
Benzyl N-phenyl carbamate
N,N'-ethylidene diurethane
Diethylene glycol bis(N,N-diisopropyl carbamate)
Diethylene glycol bis(N,N-di-n-butyl carbamate)
Triethylene glycol bis(N,N-di-n-butyl carbamate)
Tetraethylene glycol bis(N,N-di-n-butyl carbamate)
Diethylene glycol bis(N,N-di-iso-butyl carbamate)
Diethylene glycol bis(N,N-2-ethylhexyl carbamate)
Monoethylene glycol bis(N,N-ethyl phenyl carbamate)
Hexamethylene glycol bis(N,N-dibutyl carbamate)
Ethyl N-cyclohexyl-N-ethyl dithiocarbamate
Ethyl N,N-dibenzyl dithiocarbamate
Ethyl N,N-dibutyl dithiocarbamate
Benzyl N,N-diethyl dithiocarbamate
Ethyl N-phenyl thiolcarbamate
Ethyl N-phenyl thionocarbamate The preparation of mono-, di-, and polyurethanes are generally well known to those skilled in the art. The urethanes can be prepared by the reaction of isocyanates with alcohols, N-substituted ureas with alcohols at high temperatures, the treatment of chloroformic hydrocarbyl esters with primary or secondary amines, the treatment of N-substituted carbamyl chloride with an alcohol, the reaction of an alkali-metal cyanate with a hydrocarbyl halide and an alcohol, and other procedures.

As hereinabove set out, E-caprolactam is the most important member and most readily available higher lactam containing at least 6 carbon atoms in the lactam ring. Thus, the higher lactams can be illustrated by the formula

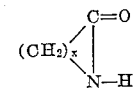

wherein $x$ is an integer of at least 5 and up to 15, preferably an integer of from 5 to about 12 and more preferably still from 5 to about 7. Since E-caprolactam is the more common member and most commercially important member of the higher lactams the instant disclosure is exemplified therewith. However, it will be understood that other higher lactams such as methylcyclohexanone isoximes, cycloheptanone isoxime, cyclooctanone isoxime, nonanolactam, decanolactam, undecanolactam, dodecanolactam, cyclopentadecanone isoxime, cyclohexadecanone isoxime, cyclic hexamethylene adipamide, etc. can be employed in the instant process.

From the foregoing illustrative examples it will be apparent that the term "urethane" when employed in the broad sense such as "urethane promoter compound," etc., is intended to embrace the disclosed class of substituted urethanes broadly, i.e., to also include the thiourethanes, the thionourethanes and the dithiourethanes, as well as the corresponding polyurethanes.

The quantity of urethane promoter compound employed in the instant anionic polymerization process can be varied over a relatively large range and can amount to the order of about 30 mole percent, considered as uerthane functionality, wherein a urethane compound, per se, such as ethyl N-phenyl carbamate has a functionality value of one, based on the higher lactam monomer, as hereinafter more fully illustrated, but generally up to about 5 mole percent of the urethane promoter compound is ample. Preferably the urethane promoter compound concentration will vary from about 0.05 to about 2 mole percent, and more preferably still from about 0.1 to about 1 mole percent of the higher lactam monomer, particularly when the monourethane compounds are employed.

Suitable catalysts in the base-catalyzed polymerization of the higher lactams to polylactams and especially of E-caprolactam to polycarprolactam for use in conjunction with the urethane promoters are any of the metals, which can be in metallic, complex ion, or a compound form, and are capable of forming a lactam salts, for example with caprolactam to form sodium caprolactam. Common examples of such catalysts suitable for the anionic polymerization of the higher lactams are the alkali and alkaline earth metals, e.g., sodium, potassium, lithium, calcium, strontium, barium, magnesium, etc., either in metallic form or in the form of hydrides, borohydrides, oxides, hydroxides, carbonates, etc. However, in the case of compounds such as the hydroxides and carbonates which give off water when reacted with lactams, the bulk of such water preferably is removed from the polymerization system, for example by the application of heat and/or reduced pressure before the base-catalyzed polymerization is effected. Thus, it is preferably that the reaction system be maintained in a substantially anhydrous condition. Other effective catalysts are the organo-metallic derivatives of the foregoing metals as well as of other metals. Examples of such organo-metallic compounds are the lithium, potassium, and sodium alkyls such as butyl lithium, ethyl potassium or propyl sodium, or the aryl compounds of such metals such as sodium phenyl, triphenyl-methyl sodium, and the like. Other suitable organo-metallic compounds are diphenyl magnesium, zinc diethyl, triisopropyl aluminum, diisobutyl aluminum hydride, etc. As a general class the materials known as Grignard reagents are effective base-catalysts for the present polymerization. Typical of such Grignard catalysts are ethyl magnesium chloride, methyl magnesium bromide, phenyl magnesium bromide, and the like. Other suitable anionic polymerization catalysts are sodium amide, magnesium amide and magnesium anilide, as well as numerous others.

The catalyst concentration employed in the instant process can vary from a small fraction of 1 mole percent, e.g., from about 0.01 mole percent, to as much as 15 to 20 mole percent, based on the lactam monomer. In general, however, the preferred catalyst concentrations will vary from about 0.05 to about 5 mole percent and more preferably still from about 0.1 to about 1 mole percent.

The following examples are illustrative of this invention.

*Example 1*

One mole (113 g.) of dry E-caprolactam was charged to the reaction vessel, which reaction vessel was swept with dry nitrogen gas prior to and during the experiment. The reaction vessel was then placed and held in an oil-bath heated to 160° C. by an external heat source. Then 0.005 mole of ethyl carbamate and 0.005 mole (0.12 g.) of sodium hydride were added to the molten E-caprolactam and the system maintained at 160° C. for about 2 hours. No viscosity increase was observed and no polymer was formed in this experiment. Accordingly, it is seen that urethane, per se, containing no substituents on the nitrogen atom, is inoperative in effecting the polymerization of higher lactams.

*Example 2*

One mole (113 g.) of E-caprolactam was introduced into the closed reaction vessel and brought to a temperature of 100° C. Then 0.005 mole (0.90 g.) of isopropyl N-phenyl carbamate and 0.005 mole (0.12 g.) of sodium hydride were added thereto and the reaction vessel placed in an oil bath held at 160° C. The reaction vessel was swept with dry nitrogen after the introduction of the E-caprolactam and thereafter nitrogen was maintained over the system during the reaction period. The temperature of the system rose to 160° C. within a period of 18 minutes and about 8 minutes thereafter the reaction system was solidified and pulled free from the reaction vessel. The reaction vessel was held in the oil bath at 160° C. for 1 hour and thereafter removed and the reaction mixture allowed to cool. The conversion of caprolactam to polycaprolactam was found to be 98.6%. The reaction product was found to have a melt index of 50.9 and a memory of 19.5.

*Example 3*

One mole (113 g.) of dried E-caprolactam was introduced into the reaction vessel and 0.005 mole (0.12 g.) of sodium hydride and 0.0025 mole (0.75 g.) of ethylene carbanilate were added thereto and the reaction mixture held in an oil bath at 160° C. for 4.5 hours. The reaction product was washed with 0.5% formic acid solution and dried at 105° C. for 20 hours. The conversion of caprolactam to polycaprolactam was found to be 80.9 percent and the product had a melt index of 21 and a memory of 28.

*Example 4*

One mole (113 g.) of the E-caprolactam was introduced into the reaction vessel and 0.05 mole (5 g.) of 2-ketotetrahydro-1,3-oxazine and 0.1 g. of sodium hydride were added thereto at 117° C. The reaction vessel was placed in an oil bath at 160° C. and after 12 hours in the oil bath the reaction vessel was removed and the reaction mixture allowed to cool. The conversion of monomer to polymer was found to be 66.3 percent.

*Example 5*

A polyurethane composition produced by the reaction of 4,4'-diisocyanatodiphenylmethane with polypropylene glycol (2025 from Union Carbide) was introduced into a reaction vessel in the amount of 13.7 grams, 98 grams of freshly distilled E-caprolactam added thereto and the reaction vessel placed in an oil bath at 100° C. The reaction system was maintained under dry nitrogen gas and after the initial reactants became molten the temperature of the oil bath was raised to 160° C. Then an additional 15 grams of molten E-caprolactam containing 0.24 gram of sodium hydride was added to the reaction system through a dropping funnel. It is seen that the catalyst amounts to 0.01 mole per mole of caprolactam and the polyurethane initiator comprises approximately 10 weight percent of the reaction mixture. The reaction mixture was observed to be a solid mass and pulled free from the walls of the reaction vessel after a period of 16 minutes from the introduction of the catalyst to the system. After a total time of 2.5 hours the reaction vessel was removed from the oil bath and cooled to room temperature. The conversion of monomer to polymer was found to be 99.1 percent. The acetone extractable portion of the reaction mixture was found to be 0.5 percent.

*Example 6*

In similar manner to the procedure set out in Example 5, 28.5 grams of the polyurethane was weighed into the reactor and 83 grams of caprolactam added thereto and the reactants converted to the liquid phase at 100° C. Then the vessel was heated to 160° C. in the oil bath and 30 grams caprolactam with 0.48 gram sodium hydride added thereto. The catalyst will be seen to amount to 0.02 mole per mole of caprolactam and the polyurethane is approximately 20 weight percent of the total composition. The reaction mixture became very viscous within a minute after the introduction of the catalyst and pulled free from the walls of the reactor during the course of 7 minutes thereafter. After a total time of 2.5 hours the reaction vessel was removed from the oil bath and cooled to room temperature. The conversion of monomer to polymer was found to be 98.5 percent and the acetone extractable component comprised about 2 percent of the reaction mixture. The polymer product was a very light ivory color.

*Example 7*

The procedure of the foregoing Example 6 was essentially repeated except that 48.5 grams (approximately 30 weight percent of the total composition) of the polyurethane was employed. The polymerization reaction mixture became very viscous in less than a minute and pulled free from the walls of the reactor in about 24 minutes.

After 2.5 hours in the oil bath at 160° C. the reactor was removed therefrom and cooled to room temperature. The conversion of monomer to polymer was found to be 97.2 percent and the acetone extractable component was 28 percent. The polymeric product was a very light ivory color.

*Example 8*

The procedure of Example 5 was essentially repeated except that the polyurethane composition employed was produced by the reaction of 4,4'-diisocyanatodiphenylmethane with Teracol 30 (a polyether glycol from Du Pont) in place of the polyurethane composition of Example 5. The conversion was found to be 98.9 percent, the acetone extractable component was 0.4 percent, and the polymeric product was a light off-white color.

*Example 9*

This example follows the procedure of Example 6 except that the polyurethane initiator composition is that of Example 8 employed in an amount of 28.5 grams per mole of E-caprolactam, i.e., about 20 weight percent of the total composition. The conversion of monomer to polymer was found to be 98.7 percent, the acetone extractable component was 0.7 percent, and the polymeric product was a light off-white color.

*Example 10*

This experiment follows the procedure set out in Example 7 above except that the polyurethane composition is that of Example 8 above employed in an amount of 48.5 grams per mole of E-caprolactam, i.e., about 30 weight percent of the total composition. The conversion of monomer to polymer was found to be 98.8 percent, the acetone extractable component was 6.2 percent and the polymeric product was an off-white color.

From the foregoing examples it will be seen that the N-substituted urethanes and analogs are effective promoters for the polymerization of higher lactams. It is also seen that the effective urethane promoter may be in the form of a compound containing a single urethane grouping or may contain a plurality of urethane groupings as in a polyurethane. It is observed that the polyurethane is bound into the polymer system as a block copolymer with the polyamide system. Furthermore the physical properties of the compositions containing up to 20 weight percent of the polyurethane more closely approach the properties of the polyamides than they do the properties of the polyurethanes.

Whereas the reaction temperature employed in the foregoing examples is at about 160° C. to demonstrate the direct polymerization of the higher lactam at a temperature above the melting point of the monomeric lactam and below the melting point of the polymeric lactam, it is possible to employ substantially higher temperatures of the order of up to about 250° C., if desired. In general the polymerization temperature for initiating the polymerization reaction should be higher than about 120° C., i.e., the polymerization system is relatively stable at temperatures below 120° C. whereby the components may be mixed together and have a relatively long pot life until external heat is applied to initiate the polymerization reaction. Accordingly, initiating temperatures of from about 120° C. to about 250° C. can be employed. Preferably temperatures of the order of about 140° C. to about 225° C. and more preferably still from about 140° C. to about 200° C. are employed.

Other advantages of the urethane-initiated polymerization system for higher lactams, such as caprolactam, are that the molecular weight of the polyamide can be readily controlled by the concentration of the particular urethane promoter compound employed, i.e., the molecular weight of the polyamide is an inverse function of the urethane concentration, and it has been found that the polyamide product has a relatively narrow molecular weight distribution.

In view of the high conversion of monomer to polymer at relatively low temperatures it will be understood that the instant process is eminently suitable for the direct polymerizaton-casting of objects in suitable molds. In effecting such polymerization-casting one may put all components together and heat them to the desired initiating temperature and cast the object by placing the reaction mixture into the desired mold. The mold of course should at least have the chill taken off to preclude removing sufficient heat to inhibit the polymerization. In this regard it is also possible to have the heat supplied to this system by first heating the mold prior to the introduction of the polymerization mixture. Additionally, the components of the reaction mixture such as the higher lactam together with the dissolved urethane promoter compound as one component and additional higher lactam together with the anionic polymerization catalyst as a second component can be independently heated and then directly mixed together in the mold to effect the desired polymerization-casting process.

The foregoing illustrative examples are directed to the use of N-substituted urethanes, per se, but it is also possible to effect the instant polymerization reaction by the reaction of suitable intermediates to form the said urethanes in situ, e.g., by the combination of an isocyanate and an alcohol in the reaction system either prior to or subsequent to the introduction of the particular higher lactam to the system.

Additionally the polymerization system can contain various pigments, fillers, reinforcing agents, discrete particles of polymeric products, dyes, etc., to incorporate such materials into the polymer product, or treat the polymeric system during the polymerization reaction as by adding a blowing agent to provide a foamed product.

This application is a continuation-in-part of our co-pending applications Ser. No. 765,069, filed Oct. 3, 1958, now U.S. Patent No. 3,086,962 and Ser. No. 165,946, filed Jan. 12, 1962, now abandoned in favor of our continuation application Ser. No. 564,424, filed July 11, 1966, wherein John M. Butler is a coinventor in the latter application.

We claim:

1. A process for effecting the polymerization of a higher lactam containing at least 6 carbon atoms in the lactam ring, comprising the anionic polymerization of the said lactam under substantially anhydrous conditions at a polymerization initiation temperature of from about 140° C. up to about 200° C. in the presence of an effective amount of from about 0.05 to about 30 mole percent, based on the lactam, of a urethane polymer promoter compound having a plurality of the N-carbamate repeating structural units

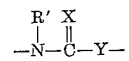

wherein X is a member selected from the group consisting of O and S; Y is a member selected from the group consisting of O and S; and R' is selected from the group consisting of a hydrogen atom, hydrocarbyl radicals, and substituted hydrocarbon radicals containing inert atoms from the group consisting of halogen, oxygen, and sulfur atoms; said repeating structural units being linked together through a plurality of divalent radicals R and R" selected from the group consisting of divalent hydrocarbon radicals, free from nonbenzenoid unsaturation, and substituted divalent hydrocarbon radicals containing inert atoms from the group consisting of halogen, oxygen and sulfur atoms.

2. The process of claim 1, wherein the higher lactam contains from 6 to 16 carbon atoms.

3. The process of claim 1, wherein the radical R' contains up to 12 carbon atoms.

4. The process of claim 1, wherein X and Y are oxygen.

5. The process of claim 4, wherein the lactam is ε-caprolactam.

6. The process of claim 1, wherein the urethane polymer is produced by the reaction of substantially equivalent amounts of 4,4'-diisocyanatodiphenylmethane and a polypropylene glycol.

7. The process of claim 1, wherein the urethane polymer composition is produced by the reaction of substantially equivalent amounts of 4,4'-diisocyanatodiphenylmethane and a polyethylene glycol.

8. Block copolymers of polyurethanes with higher polylactams produced by the process of claim 1.

9. Block copolymers of claim 8, wherein the higher polylactam is prepared from caprolactam.

References Cited by the Examiner

UNITED STATES PATENTS

| | | | |
|---|---|---|---|
| 3,028,368 | 4/1962 | Butler et al. | 260—78 |
| 3,026,046 | 5/1962 | Glickman et al. | 260—78 |

FOREIGN PATENTS

| | | |
|---|---|---|
| 921,278 | 3/1963 | Great Britain. |
| 1,262,436 | 4/1961 | France. |
| 1,287,073 | 1/1962 | France. |

MURRAY TILLMAN, *Primary Examiner.*

SAMUEL H. BLECH, *Examiner.*

P. LIEBERMAN, *Assistant Examiner.*